(12) United States Patent
Perkins

(10) Patent No.: US 6,540,247 B1
(45) Date of Patent: Apr. 1, 2003

(54) HITCH GUIDE MECHANISM

(76) Inventor: Jesse Perkins, 1426 Dayton Pike, Germantown, OH (US) 45327

(*) Notice: Subject to any disclaimer, the term of this patent is extended or adjusted under 35 U.S.C. 154(b) by 0 days.

(21) Appl. No.: 10/036,295

(22) Filed: Oct. 22, 2001

(51) Int. Cl.⁷ ............................................. B60D 1/36
(52) U.S. Cl. ...................... 280/477; 116/28 R; 33/264
(58) Field of Search ........................ 280/477; 33/264; 116/28 R

(56) References Cited

U.S. PATENT DOCUMENTS

| | | | |
|---|---|---|---|
| 3,774,149 A | * 11/1973 | Bennett | 340/431 |
| 3,889,384 A | * 6/1975 | White | 33/264 |
| 3,918,746 A | * 11/1975 | Lehtisaari | 280/477 |
| 4,012,056 A | * 3/1977 | Christensen | 280/477 |
| 4,054,302 A | * 10/1977 | Campbell | 280/477 |
| 4,541,183 A | * 9/1985 | McConnell | 33/264 |
| 4,723,788 A | * 2/1988 | Suter | 280/477 |
| 5,558,352 A | * 9/1996 | Mills | 280/477 |
| 5,927,229 A | * 7/1999 | Karr, Jr. | 116/28 R |
| 6,042,136 A | 3/2000 | Heinecke | |
| 6,273,448 B1 | * 8/2000 | Cross | 280/477 |
| 6,139,041 A | 10/2000 | Murphy | |

* cited by examiner

Primary Examiner—Kevin Hurley
(74) Attorney, Agent, or Firm—R. William Graham

(57) ABSTRACT

A hitch guide mechanism is disclosed for connection to a first tongue having a ball hitch thereon which is for mounting to a frame of a vehicle and a corresponding second tongue having a ball hitch socket for mounting to a frame of a trailer. The ball hitch includes a threaded stem and is received through a bore of the first tongue and is maintained by a threaded nut. The hitch guide mechanism includes a first member which connects to the first tongue and has a portion which extends generally vertically above the ball hitch. A second member connects to the second tongue and has a portion which extends generally vertically above the ball hitch socket. The first and second members can include separably removable sleeves. The portions extend a sufficient height when the members are so connected as to be rearwardly viewable when seated in the vehicle.

11 Claims, 3 Drawing Sheets

HITCH GUIDE MECHANISM

BACKGROUND OF THE INVENTION

1. Field of the Invention

The present invention relates to trailer hitch guide mechanisms and more particularly pertains to a new trailer hitch guide mechanism for helping a driver of a vehicle properly align the vehicle's hitch with a trailer hitch socket of a tongue of the trailer.

2. Description of the Prior Art

The use of trailer hitch guide mechanisms is known in the prior art. One prior attempt at solving the trailer hitch alignment problem is shown in U.S. Pat. No. 6,139,041.

The '041 device includes a vehicle mounted assembly designed for mounting to a vehicle above a ball hitch of the vehicle and a trailer mounted assembly designed for mounting to a trailer tongue. The vehicle mounted assembly shown includes a main member and an elongate end member coupled to the main member. The end member is designed for coupling to the vehicle such that the main member is positioned above the ball hitch of the vehicle. An elongate first guide rod is upwardly extended from the main member. The trailer mounted assembly includes an upper member and a lower member having a top portion coupled to a lower end of the upper member. An upwardly facing trailer magnet is coupled to a bottom portion of the lower member. A center extent upwardly extends from a center region of the trailer magnet and inserted into the receiving socket of the trailer tongue to magnetically couple the same. A light source is coupled to an upper end of a second guide rod. The guide rods aligned with one another when the trailer is attached to the vehicle.

The trailer hitch guide mechanism according to the present invention improves on the concepts and designs of the prior art. The invention herein provides for a hitch guide mechanism which is developed for the purpose of helping a driver of a vehicle properly align the vehicle's hitch with the trailer tongue of the trailer at a greatly reduced expense, ease of assembly and use.

SUMMARY OF THE INVENTION

It is an object to provide an improved hitch guide mechanism.

It is an object to provide a readily removable hitch guide mechanism.

It is another object of the present invention to provide a new trailer hitch guide mechanism which may be easily and efficiently manufactured and marketed.

It is a further object of the present invention to provide a new trailer hitch guide mechanism which is of a durable and reliable construction.

A further object of the present invention is to provide a new trailer hitch guide mechanism which is susceptible of a low cost of manufacture with regard to both materials and labor, and which accordingly is then susceptible of low prices of sale to the consuming public, thereby making such trailer hitch guide mechanism economically available to the buying public.

Another object is to provide a new trailer hitch guide mechanism which has many of the advantages of the trailer hitch guide mechanisms heretofore with improved novel features that result in a new trailer hitch guide mechanism which is not anticipated, rendered obvious, suggested, or even implied by any of the prior art trailer hitch guide mechanisms, either alone or in any combination thereof.

Accordingly, the present invention relates to a hitch guide mechanism for connection to a first tongue having a ball hitch thereon which is for mounting to a frame of a vehicle and a corresponding second tongue having a ball hitch socket for mounting to a frame of a trailer. The ball hitch includes a threaded stem and is received through a bore of the first tongue and is maintained by a threaded nut. The hitch guide mechanism includes a first member which connects to the first tongue and has a portion which extends generally vertically above the ball hitch. A second member connects to the second tongue and has a portion which extends generally vertically above the ball hitch socket. The portions extend a sufficient height when the members are so connected as to be rearwardly viewable when seated in the vehicle.

The first member is preferably connected below the ball hitch by way of a flange portion having a bore through which the threaded stem of the ball hitch extends and is likewise maintained by the threaded nut. The flange portion preferably is disposed beneath the first tongue. Further, the portion of the first and the second member preferably includes removably separable sleeves.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Further, the purpose of the abstract herewith is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The aforesaid together with stated objects and other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DESCRIPTION OF THE PREFERRED EMBODIMENT

Figure 1:
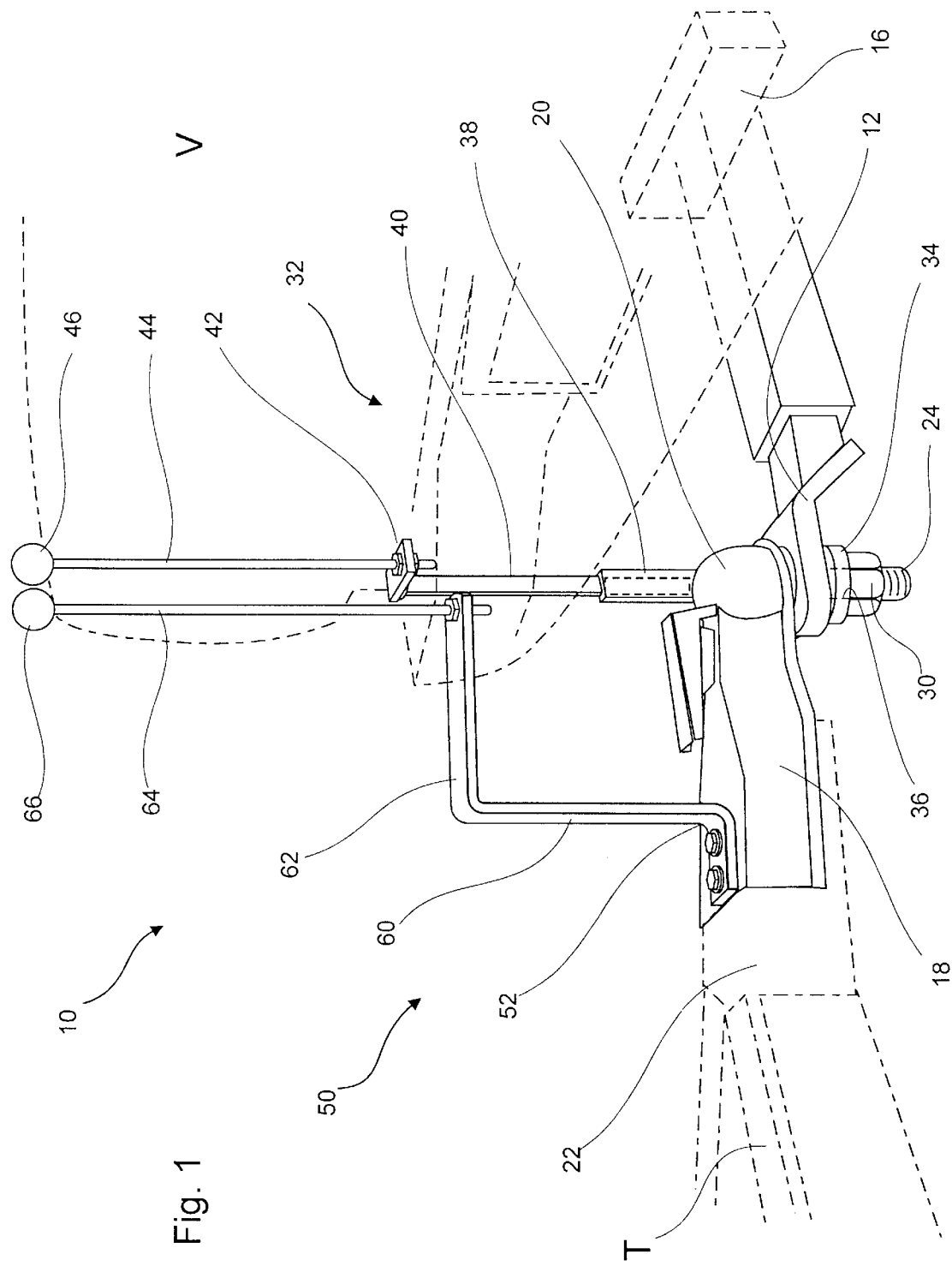
FIG. 1 is a perspective view of the hitch guide mechanism according to the present invention with a ball hitch connection between a vehicle and trailer.
Figure 2:
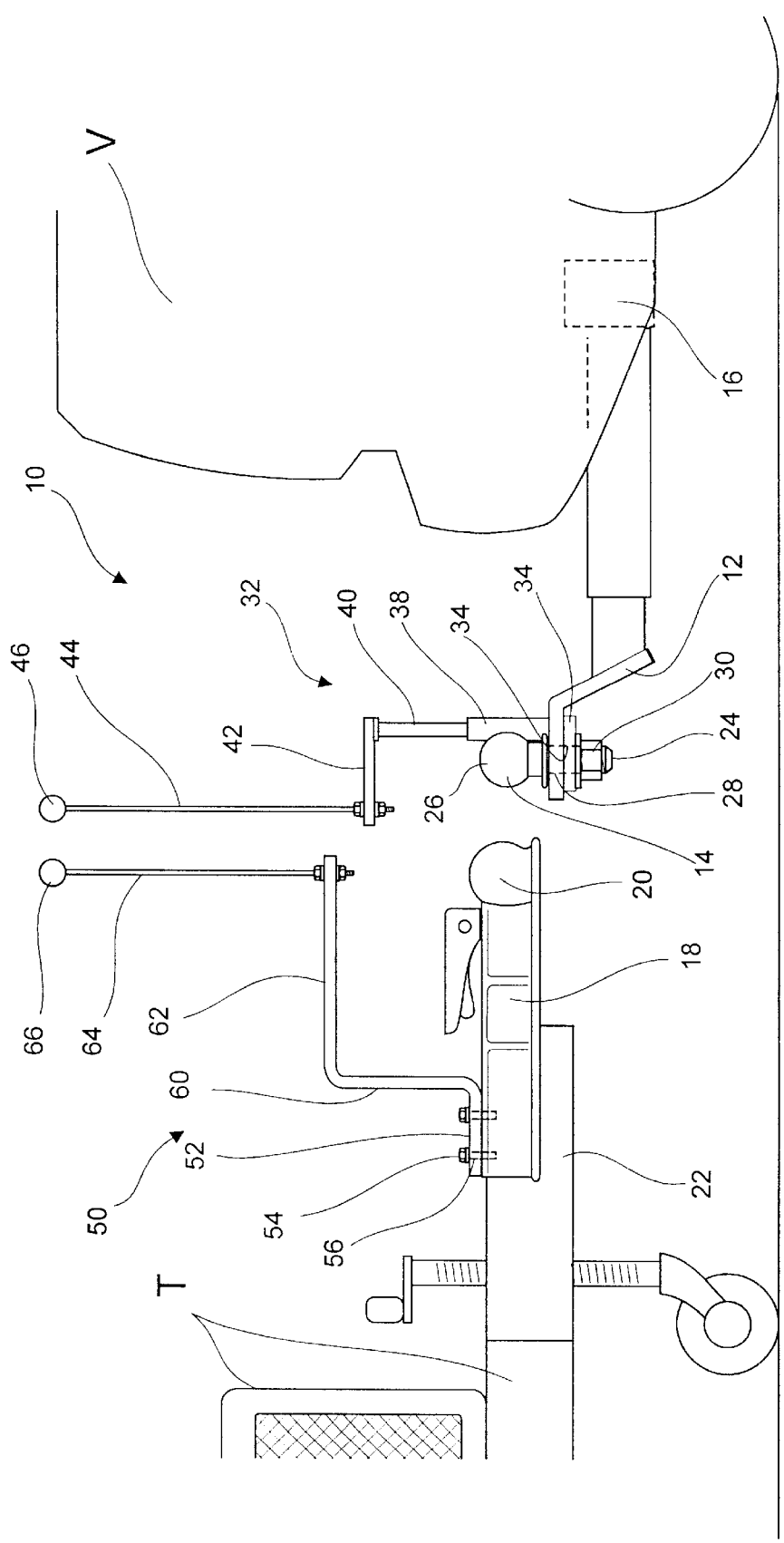
FIG. 2 is a side view of the hitch guide mechanism according to the present invention with a ball hitch not connected between a vehicle and trailer.
Figure 2A:
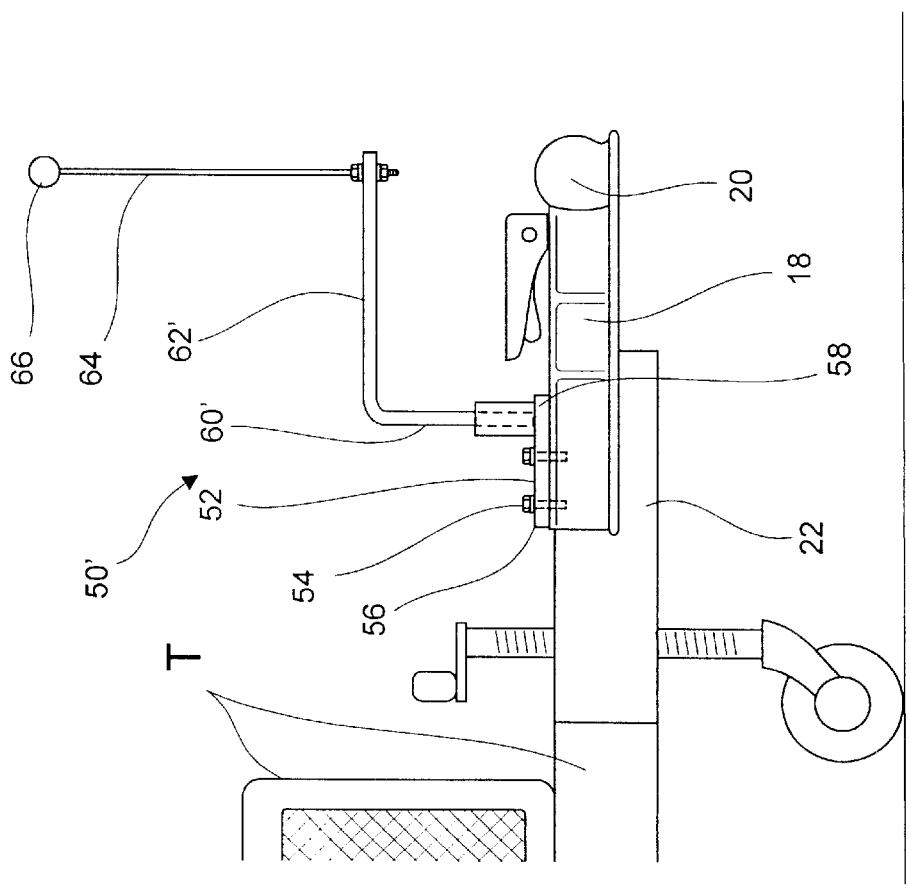
FIG. 2a is a side view of a part of the hitch guide mechanism residing on a trailer.

Referring now to the drawings, a new trailer hitch guide mechanism embodying the principles and concepts of the present invention is generally designated by the numeral 10. The trailer hitch guide mechanism 10 is designed for connection to a first tongue 12 having a ball hitch 14 thereon which is for mounting to a frame 16 of a vehicle V and a corresponding second tongue 18 having a ball hitch socket 20 for mounting to a frame 22 of a trailer T.

The ball hitch 14 includes an enlarged ball end 26 and threaded stem 24. The first tongue 12 is shown here to include a bore 28 through which the stem 24 extends and is securely maintained by a threaded nut 30.

The hitch guide mechanism 10 includes a first member 32 which connects to the first tongue 12. The first member 32 is preferably connected below the ball hitch 14 and tongue 12 by way of flange portion 34 having a bore 36 through which the threaded stem 24 of the ball hitch 14 extends and is likewise maintained by the threaded nut 30. It is noted that the flange portion 34 can be set at a desired radial position and fixed in place by the threaded nut 30 attaching to the ball hitch 14. The flange portion 34 extends laterally from the tongue 12 and connectively supports a generally vertically extending tubular sleeve 38 which removably receives therein an end of another vertically extending tubular sleeve 40 of a smaller diameter. The combined vertical height of the sleeves 38 and 40 when operably connected is sufficiently above the ball hitch 14 for purposes apparent hereinafter.

A laterally extending member 42 connects to another end of the sleeve 40 and is of sufficient length to extend over the ball hitch 14 to permit access of the ball hitch socket 20. The sleeves 38 and 40 can be fixed to prevent relative movement, such as rotational movement, for example, forming the sleeves in rectangular tubular sleeves. Ideally, the sleeves 38 and 40 are readily separable and permit sleeve 40 to be removed from the sleeve 38 which typically remains fixed adjacent the ball hitch 14 and tongue 12. Another generally vertically extending member 44 is provided having one end connected to a portion of the laterally extending member 42 which is above the ball hitch 14. Connected to an upper terminal end of the member 44 is a ball 46 (or other similar position visual aid device). The readily removable sleeve 40 and attached members 42, 44 and ball 46 provide the user with an easy solution which permits one to not only align one's vehicle V with a trailer T, but upon unhitching the trailer T from the vehicle V, quicky remove part of the hitch guide mechanism 10 for storing during normal non-towing operation of the trailer T by vehicle V.

A second member 50 has a flange portion 52 which connects to the second tongue by way of a pair of threaded bolts 54 through threaded bores 56. The flange portion 52 can also be welded to the second tongue 18. The flange portion 52 connects to an upwardly extending member 60 which likewise connects to a laterally extending member 62 which terminates in a portion above the ball hitch socket 20. Alternatively, a sleeve 58 can be provided similar to sleeve 38 with the exception that the sleeve 58 connects to flange portion 52 and receives a sleeve member 60' to permit separability and removability thereof A generally vertically extending member 64 is provided having one end connected to the portion of the laterally extending member 62 which is above the ball hitch socket 20. Connected to another upper terminal end of the member 64 is a ball 66 and has a portion which extends generally vertically above the ball hitch socket 20.

The balls 46 and 66 ideally extend a sufficient height when the members 32 and 50 are so 5 connected as to be rearwardly viewable when seated in the vehicle V. The members 44 and 64 can be of a resiliently flexible material, whereas the other components of the hitch guide mechanism 10 are preferably rigid. An illuminating source can be alternatively used with or in place of the balls 46 and 66 if so desired to aid the driver of the vehicle V to align the ball hitch 14 with the receiving socket 20 as the driver backs the vehicle V towards the trailer T.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A hitch guide mechanism for connection to a first tongue having a ball hitch with a threaded stem thereon which is for mounting to a fame of a vehicle and a corresponding second tongue having a ball hitch socket for mounting to a frame of a trailer, which includes:

a first member which connects to the first tongue by way of a flange portion having bore therethrough to receive the threaded stem of the ball hitch and a nut for connection thereto and has a portion which extends generally vertically above the ball hitch when so connected, wherein said portion of said first member is further characterized to connect to the first tongue adjacent to the ball hitch;

a second member which connects to the second tongue and has a portion which extends generally vertically above the ball hitch socket when so connected; and wherein said portions extend a sufficient height when said members are so connected as to be rearwardly viewable when seated in a vehicle.

2. The hitch guide mechanism of claim 1, wherein said first member includes a connecting sleeve portions to readily permit separability thereof.

3. The hitch guide mechanism of claim 2, wherein said portion of said first member includes a connecting sleeves to readily permit separability thereof.

4. The hitch guide mechanism of claim 1, wherein said second member includes a connecting sleeve portions to readily permit separability thereof.

5. The hitch guide mechanism of claim 2, wherein said portion of said second member includes a connecting sleeves to readily permit separability thereof.

6. A hitch guide mechanism for connection to a first tongue having a ball hitch with a threaded stem thereon which is for mounting to a frame of a vehicle and a corresponding second tongue having a ball hitch socket for mounting to frame of a trailer, which includes:

a first member which connects to the first tongue by way of a flange portion having bore therethough to receive the threaded stem of the ball hitch and a nut for connection thereto and has a portion which extends generally vertically above the ball hitch when so connected;

a second member which connects to the second tongue and has a portion which extends generally vertically above the ball hitch socket when so connected; and wherein said portions extend a sufficient height when said members are so connected as to be rearwardly viewable when seated in a vehicle and wherein at least one of said first member and said second member includes a connecting sleeve portions to readily permit separability thereof.

7. The hitch guide mechanism of claim 6, wherein said first member includes a connecting sleeve portions to readily permit separability thereof.

8. The hitch guide mechanism of claim 7, wherein said portion of said first member includes a connecting sleeves to readily permit separability thereof.

9. The hitch guide mechanism of claim 6, wherein said second member includes a connecting sleeve portions to readily permit separability thereof.

10. The hitch guide mechanism of claim 9, wherein said portion of said second member includes a connecting sleeves to readily permit separability thereof.

11. The hitch guide mechanism of claim 6, wherein said portion of said first member is further characterized to connect to the first tongue adjacent to the ball hitch.

* * * * *